(12) United States Patent
Dieckmann et al.

(10) Patent No.: US 9,242,683 B2
(45) Date of Patent: Jan. 26, 2016

(54) REAR SPOILER SYSTEM FOR A VEHICLE

(71) Applicant: WABCO GmbH, Hannover (DE)

(72) Inventors: Thomas Dieckmann, Pattensen (DE);
David Inkermann, Braunschweig (DE);
Christopher Neumann, Braunschweig
(DE); Rouven Petzold, Braunchweig
(DE); Ralf Rainer Wokoeck,
Braunschweig (DE); Frank Zielke,
Barsinghausen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/396,799

(22) PCT Filed: May 31, 2013

(86) PCT No.: PCT/EP2013/001607
§ 371 (c)(1),
(2) Date: Oct. 24, 2014

(87) PCT Pub. No.: WO2013/178366
PCT Pub. Date: Dec. 5, 2013

(65) Prior Publication Data
US 2015/0102633 A1    Apr. 16, 2015

(30) Foreign Application Priority Data
Jun. 2, 2012 (DE) .......................... 10 2012 011 082

(51) Int. Cl.
*B62D 35/00* (2006.01)
(52) U.S. Cl.
CPC ..................................... *B62D 35/001* (2013.01)
(58) Field of Classification Search
CPC .................................................... B62D 35/001
USPC ................................ 296/180.1, 180.2, 180.4
See application file for complete search history.

(56) References Cited

U.S. PATENT DOCUMENTS

| | | | |
|---|---|---|---|
| 4,458,936 A | 7/1984 | Mulholland | |
| 5,498,059 A * | 3/1996 | Switlik | 296/180.1 |
| 6,485,087 B1 | 11/2002 | Roberge et al. | |
| 7,484,791 B1 * | 2/2009 | Chen | B62D 35/001 |
| | | | 296/180.5 |
| 7,854,468 B2 * | 12/2010 | Vogel et al. | 296/180.1 |
| 8,973,974 B2 * | 3/2015 | Kunkel | 296/180.4 |
| 2008/0048468 A1 * | 2/2008 | Holubar | 296/180.4 |
| 2009/0179456 A1 * | 7/2009 | Holubar | 296/180.4 |
| 2009/0295189 A1 | 12/2009 | Distel et al. | |
| 2010/0201153 A1 | 8/2010 | Pesotini, Jr. | |
| 2010/0225143 A1 | 9/2010 | Skopic | |
| 2011/0084516 A1 | 4/2011 | Smith et al. | |
| 2011/0148140 A1 * | 6/2011 | Benton | 296/180.1 |
| 2012/0223544 A1 | 9/2012 | Benton | |
| 2013/0076064 A1 * | 3/2013 | Smith et al. | 296/180.1 |
| 2013/0106136 A1 * | 5/2013 | Smith et al. | 296/180.4 |
| 2014/0117713 A1 * | 5/2014 | Baker | 296/180.4 |

FOREIGN PATENT DOCUMENTS

| | | |
|---|---|---|
| DE | 102 28 658 A1 | 1/2004 |
| DE | 10 2008 036 888 A1 | 2/2010 |

(Continued)

*Primary Examiner* — Pinel Romain
(74) *Attorney, Agent, or Firm* — Kramer Levin Naftalis & Frankel LLP

(57) ABSTRACT

A rear spoiler system for a vehicle has at least one roof spoiler comprising a roof air-deflector element. The roof spoiler is configured to be secured only on a rear door of the vehicle without being secured on the vehicle structure. The roof air-deflector element can be raised into a driving position automatically when the rear doors are closed, and can be moved automatically into an idle position when the rear doors are open.

18 Claims, 4 Drawing Sheets

(56) References Cited

FOREIGN PATENT DOCUMENTS

| DE | 20 2009 015 009 U1 | 2/2010 |
| DE | 20 2009 014 476 U1 | 3/2010 |
| DE | 20 2009 014 510 U1 | 3/2010 |
| DE | 10 2009 014 860 A1 | 10/2010 |
| DE | 10 2009 034 517 A1 | 1/2011 |
| DE | 10 2011 114 871 A1 | 4/2013 |
| WO | WO 2008/024386 A2 | 2/2008 |

* cited by examiner

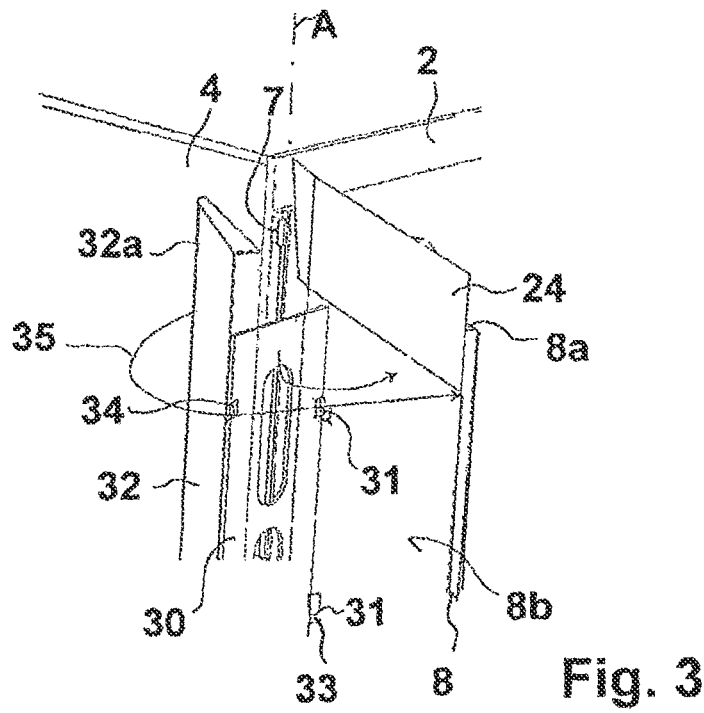
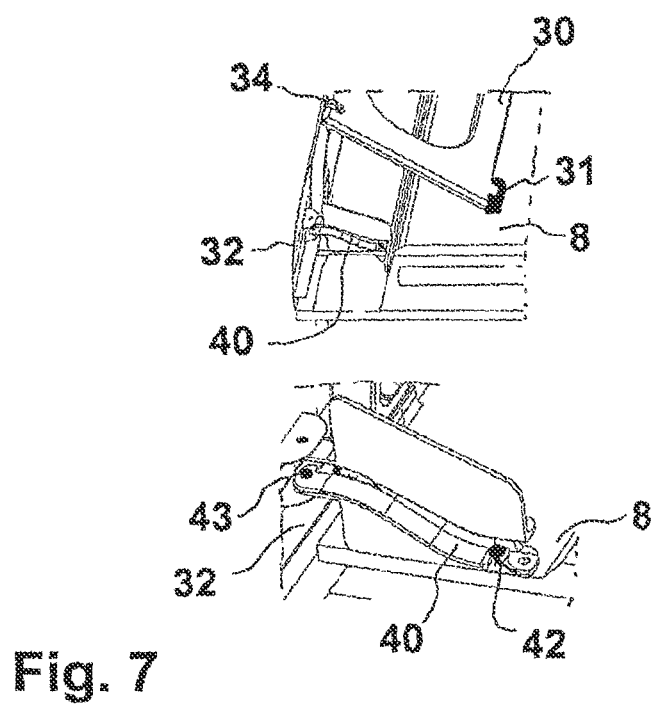

REAR SPOILER SYSTEM FOR A VEHICLE

FIELD OF THE INVENTION

The present invention generally relates to a rear spoiler for a vehicle.

BACKGROUND OF THE INVENTION

Rear spoilers serve to improve vehicle aerodynamics and can correspondingly reduce fuel consumption. They are fitted in the rear region of the vehicle and generally have air-guiding elements that lengthen the contours of the vehicle to the rear, for example with curved surfaces. Rear spoilers of this type can also be fastened to the vehicle roof or to the side walls.

DE 20 2009 014 476 U1, DE 20 2009 014 510 U1 and DE 20 2009 015 009 U1 describe rear spoiler constructions, in which the air-guiding elements or spoiler elements are arranged displaceably or pivotably in order to permit unimpeded opening of the vehicle door.

Pivotable or foldable rear spoilers are generally connected to the hinge of the rear door. DE 102 28 658 A1 describes various folding solutions, in which planar surfaces, which are pivotable via a hinge, are intended to enable aerodynamic optimization in the travel region.

DE 10 2008 036 888 A1 describes constructions of rear spoilers and connections to the vehicle, in which, inter alia, a carrier is fit between the rear door and the air-guiding element, which carrier can be unhinged for a substantially pivoted-out position of the door. As the rear flap is pivoted outward about the vertical pivot axis thereof, the air-guiding element is first also pivoted until it reaches the outer surfaces of the side wall. As the rear flap is subsequently pivoted out, the flexible carrier element is correspondingly compressed.

Such connections of the air-guiding elements in the hinge region generally permit an adjustment of the air-guiding element between the rear door and the side wall when the rear door—as is often provided in the case of utility vehicles—is pivoted outward by 270° in order to be fastened, for example, to the side wall.

However, systems of this type are generally very complex. They have, inter alia, complex joint or hinge constructions. Furthermore, some rear spoiler systems only permit the use of relatively short air-guiding elements, and therefore the improvement in aerodynamics is limited.

Furthermore, the space in the hinge region of the rear door is very confined as the rear door swings open, and therefore more complex rear spoiler constructions may impair the operation to swing open by 270°.

SUMMARY OF THE INVENTION

Generally speaking, it is an object of the present invention to provide a rear spoiler that can be constructed with relatively little outlay and permits reliable adjustment between the driving position and the basic position.

According to an embodiment of the present invention, the rear spoiler device has at least one roof spoiler with a roof air-guiding element; a roof spoiler of this type is preferably provided on each rear door. The roof spoiler is fastened to the rear door or to the door leaf of the rear door and not to the vehicle structure. The roof air-guiding element is automatically adjustable between a driving position and a retracted basic position.

The roof spoiler preferably has a fastening device for fastening to the rear door, wherein the roof air-guiding element is adjustable, in particular pivotable, in relation to the fastening device. For the automatic adjustment, a bearing structure, in particular a cam, is preferably formed on the roof air-guiding element. The bearing structure can, for example, project to the rear in the basic position and, during closing of the rear door, pass onto the vehicle structure such that, as the rear door is closed further, the bearing structure is adjusted, for example by rolling on the vehicle structure, and therefore a pivoting torque is exerted on the roof air-guiding element, the pivoting torque pivoting the latter upward into the driving position thereof.

The fastening device can be placed into the rear door or the door leaf of the rear door, for example, predominately or even exclusively from above; if the rear door is closed on the upper side thereof, corresponding holes can be drilled for this purpose. The fastening device can have, for example, insertion rods that run vertically and engage in the holes in the rear door.

Alternatively, with a rigid coupling between cam and roof air-guiding element, in which the roof air-guiding element in each case always protrudes to the rear when the rear door is closed, the roof air-guiding element can also be manually releasable and retracted when the rear door is closed, for example in order to improve space-saving parking of the vehicle and transport by train or ship.

A number of advantages are afforded by the roof spoiler according to the inventive embodiments. Advantageously, the roof spoiler does not have to be fastened to the vehicle structure or to the vehicle roof; fastening to the rear door is sufficient. The fastening can therefore be accomplished rapidly and is independent of roof types or the design of the roof structure. Since the roof spoiler is preferably even only fastened to the upper edge of the rear door, for example by being fitted in vertically, a rapid fitting operation is possible without constraining the outer surface of the rear doors.

The fastening device can be formed cost-effectively, for example integrally, for example as a metal plate with a corresponding construction of insertion rods or insertion regions, wherein the roof air-guiding element can be designed, for example, as a plastic injection molded part with one or more cams that project to the rear and have a rounded cam surface.

A cost-effective construction, simple fitting to just the rear door, and an automatic adjustment operation during the opening and closing of the rear door are therefore possible in a simple manner.

According to a preferred embodiment, at least one side spoiler for fitting to the rear door is provided in addition to the roof spoiler. In the case of the conventional construction of a vehicle rear with two rear doors in each case swinging open laterally, the rear spoiler device therefore preferably has two side spoilers that can be fitted to one of the rear doors in each case.

The side air-guiding element of the side spoiler can be fitted to the rear door via an additional link. The link can be fitted to the rear door via a first swivel joint, in particular a vertical first axis of rotation having a plurality of swivel joints. The side air-guiding element is coupled to the link preferably via a second axis of rotation. The second axis of rotation is therefore advantageously formed on or between that end of the side air-guiding element that is at the rear in the driving position and that end of the link that is at the rear in the driving position. For this purpose, vertically spaced apart second swivel joints are formed between the end regions of the link and of the air-guiding element.

The side air-guiding element is locked releasably to the vehicle preferably via a locking structure formed at the front end of the side air-guiding element.

A lockable arrangement that, after unlocking, is pivotable or adjustable is therefore formed. The side air-guiding element can be connected to, in particular flush, or aligned with the corresponding side wall of the vehicle. However, unlike in the case of conventional connections of the side air-guiding element to the hinge, the side air-guiding element is unlockable at the front end region thereof in order, after unlocking, to be pivoted about the link and, together with the link, toward the center of the rear door.

This achieves a number of advantages. The otherwise confined construction space in the hinge region of the rear door is not constrained or not constrained to a relevant extent; after being unlocked, the lateral side air-guiding element can be pivoted in about the link toward the center, and therefore the entire rear door can subsequently be pivoted outward by, for example, approximately 270° and can be placed against, or fastened to, for example, the side wall. The side spoiler together with the side air-guiding element and link is therefore accommodated between the rear door and the side wall without having an impeding effect in the hinge region. The entire length of link and side air-guiding element can be selected, for example, such that the side spoiler, which is completely folded over in the basic position, extends somewhat toward the edge of the door (center of the vehicle rear); the fastening of the rear door to the side wall is therefore not impeded by the side spoiler.

The first swivel joint of the link is advantageously fitted to the rear door in a manner sufficiently spaced apart from the hinge, for example at a distance of 10 cm or more from the hinge of the rear door. For the fastening, it is possible, for example, for holes to be drilled into the rear door, the holes then being closed in turn by the first swivel joints.

According to alternative embodiments, the lockable locking structure at the front end of the side air-guiding element can be implemented on the vehicle structure or the side walls, or else on the rear door or the door leaf. In all cases, in the driving position, when the rear door is closed, a stable triangle is formed, the sides of which are formed by the link, the side air-guiding element and the vehicle, and the corners of which are formed by the first swivel joint (or the plurality of first swivel joints), the second swivel joint and the locking structure.

Such triangle construction is stable, even if two or even three of the corners are formed by swivel joints or swivel bearings. The first and second swivel joints therefore do not have to be locked. A construction is produced that also prevents, or keeps light, a fluttering or flexible vibrating of the side air-guiding elements when the vehicle is traveling, since the front end region of the side air-guiding element is locked and the rear end thereof is held by the link. The material of the side air-guiding element can therefore optionally be selected to be freer, for example also thinner, than in the case of conventional constructions with an air-guiding element that is not connected to the rear.

The link can be designed for forming sufficient stability. For example, it can also be designed with a rib structure or recesses for reducing the material consumption and weight. Overall, a relatively low weight and low production costs arise.

It should be appreciated that the side spoiler according to the inventive embodiments permits fitting to different door variants and door systems; in particular, the precise construction of the hinge of the rear doors, which may vary greatly for different manufacturers and types of vehicle, is not relevant; all that need be provided are fastenings of the first swivel bearing to the rear door by, for example, drilling holes, and a locking retainer of the locking structure at the front end or the front edge of the lateral side air-guiding element.

According to one embodiment, the locking of the front end of the air-guiding element to the vehicle can take place on the rear door itself. The stable triangle, which is formed in the driving position, is therefore formed by the link, side air-guiding element and the rear door. In order to permit a flush connection of the side air-guiding element to the side wall, for example, a connector fitted in the region of the front edge of the side air-guiding element, for example a connecting tab, can extend for this purpose laterally to a locking retainer on the rear door. Therefore, even when the air-guiding element is connected to the rear door, a fixed closure of the front end region of the side air-guiding element can be achieved with favorable aerodynamic properties and without the tendency to flutter. The locking structure can be designed, for example, as an eyelet or receiving hole, and the locking retainer can be designed as a fastening pin on the rear door.

In an alternative embodiment, the front end of the side air-guiding element is not fastened to the rear door, but rather to the vehicle structure, that is, to what is referred to as the portal of the rear region of the vehicle, or else to the side walls (if the vehicle has fixed side walls). In this embodiment, the locking structure can be automatically unlatched during the opening of the rear door since, when the rear door swings open, the position of the first axis of rotation in relation to the locking structure is changed. This automatic unlatching can take place, for example, by the pivoting operation, in which the side air-guiding element is pivoted with the front locking structure thereof in the latching retainer.

Synergistic effects occur between the construction of the roof spoiler and of the side spoiler, since, during the opening of the rear door, first the roof spoilers automatically retract (pivot downward) and therefore the link and the side air-guiding element can subsequently be placed thereon, wherein it is optionally also possible to design the link to be shorter vertically such that the link is placed only onto the rear door and does not extend in the vertical direction as far as the roof air-guiding element. The cam, which protrudes to the rear, does not impede the pivoting operation and the application of the side spoilers.

Therefore, during the opening of the rear door, the deadweight of the roof air-guiding element first causes the latter to automatically fold or pivot downward without having an adverse effect on the side spoilers. The side spoilers can subsequently be completely folded over, as described above.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

The present invention is described below using a number of embodiments with reference to the attached drawings, in which:

FIG. 3 is an enlarged detail view with a rear door partially open;

FIG. 7 shows an embodiment with the side air-guiding element locked to the rear door.

Figure 1:
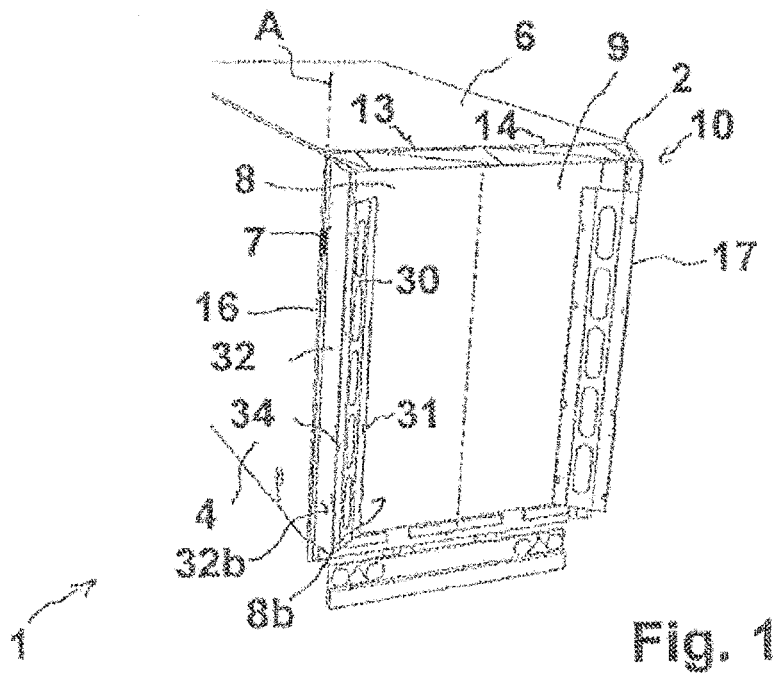
FIG. 1 is a perspective rear view of a utility vehicle when the rear doors are closed and with a rear spoiler according to one embodiment of the present invention in the driving position.

LIST OF REFERENCE CHARACTERS 1 utility vehicle
2 vehicle structure
3 loading space
4,5 side walls
6 vehicle roof
7 hinge
8, 9 rear doors
8a upper edge of the rear door 8
8b outer side of the rear door 8
10 rear spoiler
13, 14 roof spoiler
16, 17 side spoiler
20 fastening device (bearing part) of the roof spoiler 13, 14
21 insertion rods
22 holes in upper edge 8a
23 axis of rotation
24 roof air-guiding element
25 outer surface
26 cam
26a cam surface
30 link
31 first swivel joints
32 side air-guiding element
32a front edge of the side air-guiding element 32
33 holes in the rear door
34 second swivel joints between side air-guiding element 32 and link 30
35 path of movement of front edge 32a of the side air-guiding element 32
36 latching hook (locking hook)
37 locking retainer on the side wall 4 or vehicle structure 2
40 locking tab
42 locking pin (locking retainer)
43 screw or bolt
A pivot axis of the rear doors

DETAILED DESCRIPTION OF THE PREFERRED EMBODIMENTS

Figure 2:
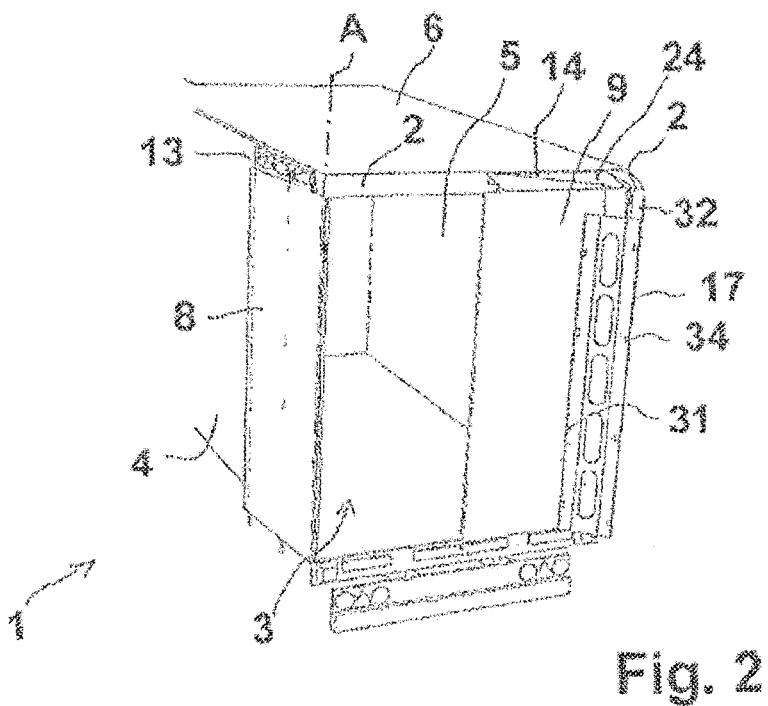
FIG. 2 is a rear view, corresponding to FIG. 1, with a rear door open.

According to FIGS. 1 and 2, a utility vehicle 1 has a vehicle structure 2, which, in the rear region, is also called a portal, and a loading space 3, which is delimited outward by side walls 4, 5 and upward by a vehicle roof 6. Side walls 4, 5 and the vehicle roof 6 can be constructed fixedly or as supporting parts in, for example, a box-type truck and can be correspondingly fixedly connected to the vehicle structure 2. Furthermore, the construction of the side walls 4, 5 and optionally of the vehicle roof 6 with tarpaulins is also known.

The loading space 3 can be closed to the rear by two rear doors 8, 9, which, starting from the closed position thereof in FIG. 1, are pivotable about the hinges 7 thereof by approximately 270° outward about the respective pivot axis A thereof and can be placed against, or else can be locked to, for example, the respective side wall 4, 5.

A rear spoiler device 10, which has two roof spoilers 13, 14 and two side spoilers 16, 17 is fitted to the utility vehicle 1.

Figure 5:
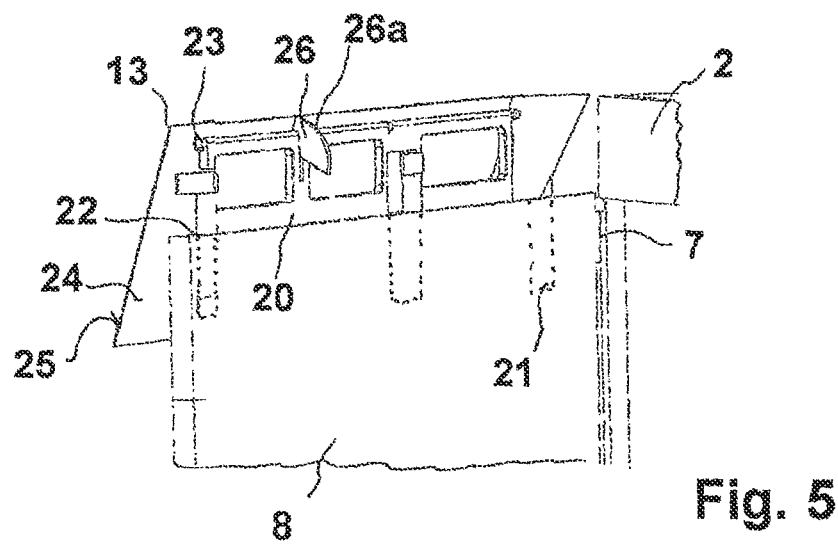
FIG. 5 is a rear view of a vehicle door with a roof spoiler according to one embodiment of the present invention.

The two roof spoilers 13, 14 are advantageously fastened exclusively to the two rear doors 8, 9 by being inserted from above. According to FIG. 5, the left roof spoiler 13 (in the direction of travel) has a fastening device (bearing part) 20 that is fastened to the rear door 8. For this purpose, the fastening device 20 can be, for example, three insertion rods 21 that extend vertically downward and are placed into the rear door 8 from above. If the upper side of the rear door 8 is already open, the insertion rods 21 can correspondingly be inserted directly; when a door leaf is closed, holes 22 can first be drilled into the upper edge 8a of the rear door, and insertion rods 21 are then subsequently inserted into the holes from above.

Furthermore, the fastening device 20 has an axis of rotation 23 for a roof air-guiding element 24. The roof air-guiding element 24 is manufactured as an integral plastics part, for example plastic injection molded part, with a planar or slightly curved outer surface 25, the shaping of which is known. When the rear door 8 is closed, the roof air-guiding element 24 essentially forms a lengthening of the vehicle roof 6, for example with a slight curvature downward. Furthermore, the roof air-guiding element 24 has one or more cams 26 that are also formed, for example, during production by injection molding.

Figure 4:
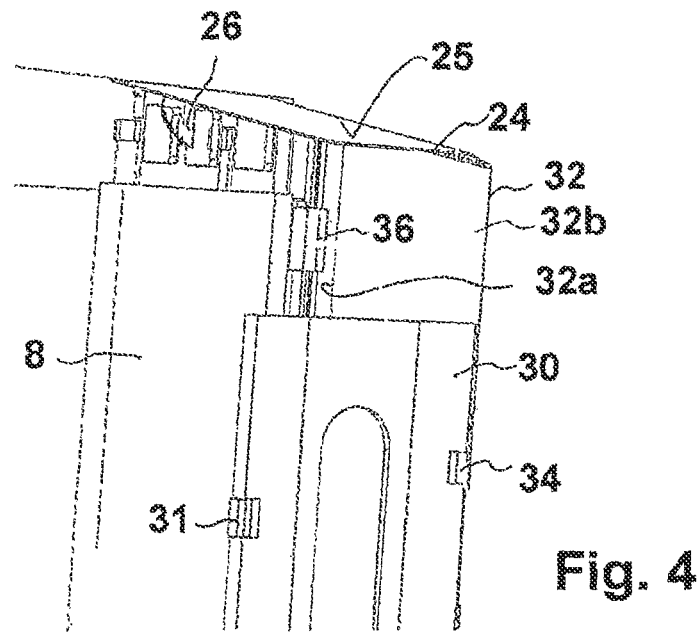
FIG. 4 is a perspective view of the rear spoiler according to an embodiment of the present invention for the rear.

The fastening device 20 can be formed, for example, from steel or else from plastic. In the embodiment shown, the entire roof spoiler 13 is therefore formed, for example, in two parts with the fastening device 20 and the roof air-guiding element 24, optionally with an additional axis of rotation 23. When the fastening device 20 is anchored in the rear door 8, the cam 26 projects to the rear; the deadweight of the roof air-guiding element 24 causes the latter to pivot downward about the axis of rotation 23 and to bear, for example, against the rear door 8. If the rear door 8 is subsequently pivoted from the open position shown in FIG. 5 into the driving position of FIG. 4, the cam 26 projecting to the rear first reaches against the vehicle structure 2, for example against a cross member in the upper rear region of the utility vehicle 1. The cam 26 here has a curved cam surface 26a that rolls on the vehicle structure 2 during the shutting of the rear door 8, and therefore the entire roof air-guiding element 24 pivots upward about the axis of rotation 23.

When the rear door 8 is closed, the cam 26 therefore continues to bear with the cam surface 26a against the vehicle structure 2 and is therefore supported in the upwardly projecting position by the cam 26 or the plurality of cams 26. If the rear door 8 is subsequently opened again, the cam 26 rolls on the vehicle structure 2 and projects again to the rear; the deadweight of the roof air-guiding element 24 therefore causes the latter to drop automatically from the functional position thereof when the rear door 8 is shut into the downwardly pivoted or downwardly folded basic position in FIG. 5. An actuation by the user is therefore not required.

The two side spoilers 16, 17 each have a link 30 and a side air-guiding element 32. The link 30 is fastened in, for example, four first swivel joints 31 on the outer side 8b of the rear door 8, for which purpose, for example, holes 33 can be drilled into the rear door 8. The side air-guiding element 32 is fastened in turn to the link 30 via two swivel joints 34. The link 30 can be manufactured, for example, from metal, for example aluminum or steel; the side air-guiding element 32 is advantageously formed from plastic, for example in the form of an injection molded part.

The side air-guiding elements 32 are in each case latched in a locking structure 36, 40 in corresponding locking retainers 37, 42 on the utility vehicle 1. According to alternative embodiments, locking or latching can either take place, according to FIG. 7, to the respective rear door 8, 9 or, according to FIGS. 6 and 7, to the vehicle structure 2 or the side walls 4, 5.

In the embodiment of FIG. 7 with locking to the rear door 8, i.e., to the door leaf itself, a locking tab 40 can be provided, or fitted as an additional component, for example in the region of the front edge 32a of the side air-guiding element 32, the locking tab being able to lock in a locking pin 42, which serves as the locking retainer and is fitted to the rear door 8 or to the outer side 8b of the rear door 8. According to FIG. 7, the front edge 32a therefore ends flush with the side wall 3, with secure fastening to the rear door 8 nevertheless being possible via the locking tab 40 projecting toward the center. The locking tab 40 can be manufactured from metal or plastic; it can be fastened, for example, to a corresponding retainer of the side air-guiding element 32 by a screw 43 or bolt.

Figure 6:
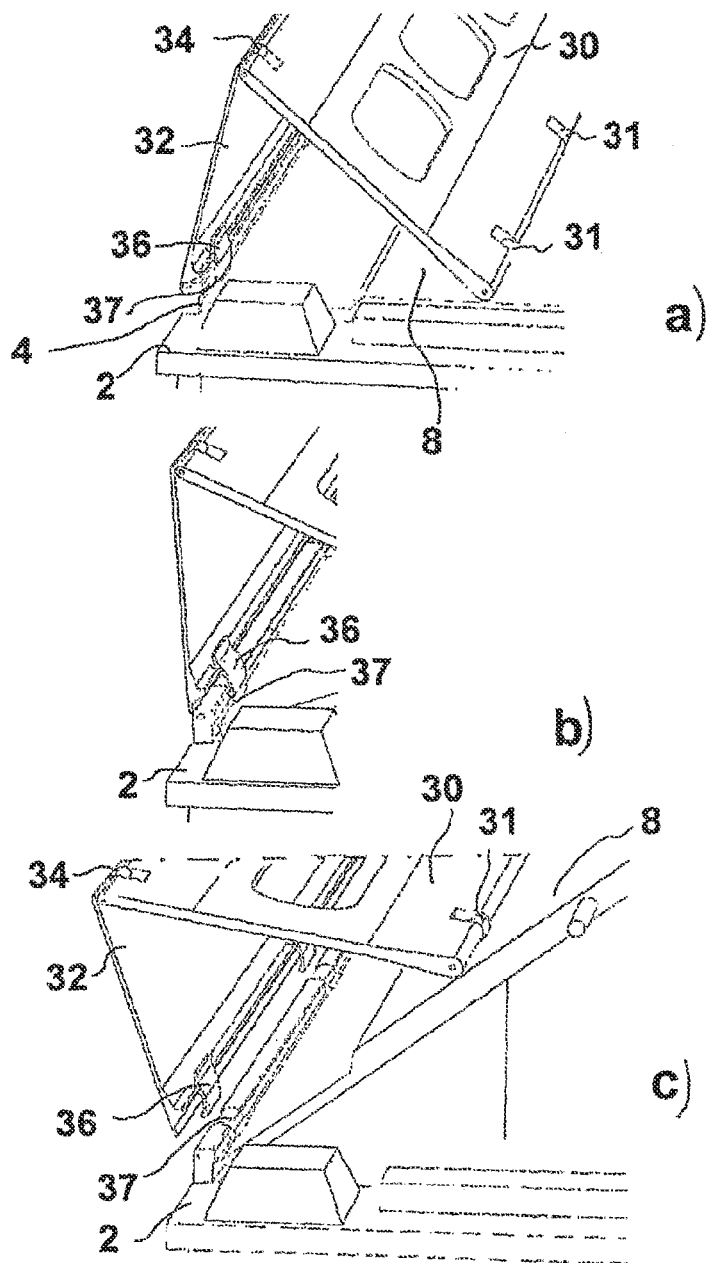
FIG. 6 illustrates steps of the initial adjustment of the side spoiler during the opening of the rear door and locking of the side air-guiding element to the vehicle structure in accordance with an embodiment of the present invention.

In the embodiment of FIG. 6, a latching hook (locking hook) 36 is fitted as the locking structure to the end of the side air-guiding element 32. The latching hook locks in a locking retainer 37 on the side wall 4 or the vehicle structure 2.

The side air-guiding elements 32 form a lengthening of the side walls 4, 5, as is customary in the case of side spoilers; for this purpose, the side air-guiding elements 32 can have a planar or suitably curved shape. As shown in the drawing figures, the swivel joints 31, 34 are advantageously formed at the ends of the links 30. Correspondingly, the second swivel joints 34 and the locking structure 36, 40 are advantageously provided in end regions of the side air-guiding elements 32.

The link 30 and the side air-guiding element 32 therefore form, together with the vehicle 1, together with the respective rear door 8 or 9 of the vehicle 1 according to FIG. 7, a stable triangle, the corners of which are formed by the two swivel joints 31, 34 and the latching connection between the locking structure 36, 40 and the locking retainer 37 or the locking pin 42.

From the driving position, the rear spoiler device 10 is retracted into the basic position thereof by the rear doors 8, 9 first being opened somewhat. However, by this, the respective left and right roof air-guiding element 24 of the roof spoilers 13, 14 drops downward and therefore bears against the respective rear door, 8, 9. By opening of the rear doors 8 and 9, in the embodiment of FIG. 6 in position a), the locking hook 36 can already be automatically unlatched from the locking retainer 37. However, a construction with manual unlatching is also possible. A manual unlatching is always provided when the side air-guiding element 2 is fastened to the locking pin 42 of the rear door 8 or 9 according to FIG. 7.

All the side spoilers 16, 17 are subsequently in each case retracted toward the center by, for example, a user grasping the respective side air-guiding element 32 and pivoting the latter inward in a large pivoting movement such that the side air-guiding element 32 pivots about the second swivel joints 34 on link 30 and link 30 into the first swivel joints 31 on the rear door 8 or 9. During this adjustment into the basic position, the link 30 is folded over, for example, by approximately 100° and the side air-guiding element 32 is additionally pivoted in relation to the link 32 by, for example, approximately 100° in turn. FIG. 3 shows the path of movement 35 of the front edge 32a of the side air-guiding element 32. The links 30 can preferably come to bear flat directly against the rear door 8 or 9; the upper region of the side air-guiding element 32 can come to bear against the respective downwardly folded roof air-guiding element 24.

The rear doors, 8, 9 are then folded over completely to the outside about the pivot axes A thereof, with a total pivoting angle of approximately 270°. The rear spoiler 10 with roof spoilers 13, 14 and side spoilers 16, 17 is therefore accommodated between the rear door 8 or 9 and the side wall 3 or 4.

In the locked or latched driving position, the front edge 32a of the side air-guiding element 32 advantageously bears against or behind the vehicle structure 2. An outer surface 32b (air-guiding surface) of the side air-guiding element 32 therefore ends flush with the left side wall 4, and therefore turbulence does not form in the transition region.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A rear spoiler system for a vehicle, the rear spoiler system comprising at least one roof spoiler having a roof air-guiding element, the at least one roof spoiler being configured to fasten to only at least one rear door of the vehicle such that the roof air-guiding element is automatically positioned into a driving position during closing of the at least one rear door and is automatically positioned into an idle position during opening of the at least one rear door.

2. The rear spoiler system as claimed in claim 1, wherein the at least one roof spoiler has a fastening device configured to fasten to the at least one rear door, wherein the roof air-guiding element is mounted pivotably on the fastening device and has a bearing device for bearing against a structure of the vehicle when the at least one rear door is closed and for positioning the roof air-guiding element into the driving position during closing of the at least one rear door, and wherein, when the at least one rear door is opened, the roof air-guiding element pivots downward under its weight into the idle position with the bearing device projecting rearward.

3. The rear spoiler system as claimed in claim 2, wherein the bearing device is a cam that is one of integral with and connected to the roof air-guiding element, the bearing device having a cam surface for bearing against the vehicle structure and for rolling on the vehicle structure, with the cam being pivoted, during closing of the at least one rear door.

4. The rear spoiler system as claimed in claim 2, wherein the fastening device is configured to fasten to an upper edge of the at least one rear door.

5. The rear spoiler system as claimed in claim 4, wherein the fastening device has an axis of rotation on which the roof air-guiding element is pivotably mounted, and insertion rods extending vertically downward for insertion into the upper edge of the at least one rear door.

6. The rear spoiler system as claimed in claim 1, further comprising at least one side spoiler having at least one side air-guiding element that is adjustable between (i) the driving position for contour lengthening and aerodynamic air guidance when the at least one rear door is closed and (ii) the idle position when the at least one rear door is open, and wherein the at least one side spoiler has a link having a first swivel joint for pivotable fastening to the at least one rear door, the at least one side air-guiding element is coupled pivotably to the link by a second swivel joint, and a front end region of the at least one side air-guiding element has a locking mechanism for releasable and lockable fastening to the vehicle.

7. The rear spoiler system as claimed in claim 6, wherein, in the driving position, the link, the at least one side air-guiding element, and the vehicle define a triangle layout, corners of the triangle layout being formed by the first swivel joint, the second swivel joint, and the locking mechanism.

8. The rear spoiler system as claimed in claim 6, wherein the first swivel joint is one of a plurality of vertically spaced apart first swivel joints for fastening in holes in the at least one rear door.

9. The rear spoiler system as claimed in claim 6, wherein the locking mechanism is one of a plurality of vertically spaced apart and manually releasable and lockable locking mechanisms for locking locking retainers of the vehicle.

10. The rear spoiler system as claimed in claim 6, wherein the locking mechanism is lockable to one of the vehicle structure and a side wall of the vehicle.

11. The rear spoiler system as claimed in claim 10, wherein the locking mechanism is automatically unlockable when the at least one rear door opens.

12. The rear spoiler system as claimed in claim 6, wherein the locking mechanism is lockable to the at least one rear door of the vehicle.

13. The rear spoiler system as claimed in claim 12, wherein the locking mechanism has a locking part extending in a lateral direction toward a center of the vehicle for releasable locking to a locking retainer on the at least one rear door.

14. The rear spoiler system as claimed in claim 6, wherein the at least one side spoiler includes two side spoilers, wherein the at least one roof spoiler includes two roof spoilers, wherein the at least one rear door includes two rear doors, and wherein, in the idle position, when the two rear doors are open, the two side spoilers bear against the downwardly folded roof spoilers.

15. A vehicle, comprising the rear spoiler device as claimed in claim 14, wherein, when unlocked, each of the two rear doors is foldable outward by about 270° and is one of placeable against and lockable to a side wall of the vehicle, and wherein, when the locking mechanism is unlocked, each of the at least one side air-guiding element is pivotable about the second swivel joint and the link is pivotable about the first swivel joint.

16. The rear spoiler system as claimed in claim 9, wherein the locking mechanisms are latching hooks.

17. The rear spoiler system as claimed in claim 13, wherein the locking part is a locking tab.

18. The rear spoiler system as claimed in claim 13, wherein the locking retainer is a locking pin.

* * * * *